(12) United States Patent
Kraibühler et al.

(10) Patent No.: US 9,339,971 B2
(45) Date of Patent: May 17, 2016

(54) CONTROL METHOD FOR MAPPING (71) Applicant: Arburg GmbH + Co. KG, Lossburg (DE)

(72) Inventors: Herbert Kraibühler, Lossburg (DE); Eberhard Duffner, Starzach (DE)

(73) Assignee: ARBURG GMBH + CO. KG (DE)

( * ) Notice: Subject to any disclaimer, the term of this patent is extended or adjusted under 35 U.S.C. 154(b) by 116 days.

(21) Appl. No.: 14/077,529

(22) Filed: Nov. 12, 2013

(65) Prior Publication Data
US 2014/0070462 A1    Mar. 13, 2014

Related U.S. Application Data (63) Continuation of application No. PCT/EP2012/005259, filed on Dec. 19, 2012.

(60) Provisional application No. 61/724,682, filed on Nov. 9, 2012.

(30) Foreign Application Priority Data

Dec. 23, 2011  (DE) .......................... 10 2011 121 956

(51) Int. Cl.
*B29C 41/52* (2006.01)
*G06F 19/00* (2011.01)
*B29C 67/00* (2006.01)

(52) U.S. Cl.
CPC ......... B29C 67/0055 (2013.01); B29C 67/0059 (2013.01); B29C 67/0085 (2013.01); B29C 67/0088 (2013.01)

(58) Field of Classification Search
CPC .... B29C 41/02; B29C 41/52; B29C 67/0059; B29C 67/0085; B29C 67/0088; B41J 2/04; B41J 2/045; B41J 2/04536; B41J 2/04581; B41J 2/135; B41J 2/14201; B41J 2/14298; G06F 19/00
USPC ............. 264/40.1, 308; 347/9, 10, 11, 14, 44, 347/47, 54, 68, 69, 70; 700/118, 119
See application file for complete search history.

(56) References Cited

FOREIGN PATENT DOCUMENTS

EP    1886793 A1    2/2008
EP    2266782 A1    12/2010

OTHER PUBLICATIONS

International Search Report for corresponding application PCT/EP2012/005259 filed Dec. 19, 2012; Mail date Apr. 23, 2013.

*Primary Examiner* — Leo B Tentoni
(74) *Attorney, Agent, or Firm* — Cantor Colburn LLP (57) ABSTRACT

A method for producing a three-dimensional object from solidifiable material, which is either present in the starting state in a fluid phase or can be liquefied, by the sequential discharge of drops from at least one pressurisable material storage device for the fluid phase by means of at least one discharge unit through an outlet provided with a pulsable closure element, the closure element is actuated by means of an actuator and its initial stressing is measured at the operating point by means of the actuator, where the initial stressing is controlled by means of an adjusting element, and a mapping for the elastic deformation of the closure element is determined by means of the actuator actuated by the adjusting element, such that an elastic working range of the closure element is adjusted by means of the adjusting element within the mapping.

11 Claims, 6 Drawing Sheets

CONTROL METHOD FOR MAPPING

CROSS REFERENCE TO RELATED APPLICATION

This application is related to and claims the benefit of U.S. Provisional Application No. 61/724,682 filed on 09 Nov. 2012. This application is also related to and claims the benefit of German Patent Application Number 10 2011 121 956.4 filed on 23 Dec. 2011. This application is also a continuation of International Patent Application Number PCT/EP2012/005259 filed on 19 Dec. 2012. The contents of all of said applications are herein incorporated by reference in their entirety.

TECHNICAL FIELD

The invention relates to a control method for mapping for the production of a three-dimensional object from solidifiable material in accordance with the preamble of claim 1.

BACKGROUND

In plastic part production it is known to produce parts in large batch sizes and series by injection moulding or extrusion. The advantage of plastic injection moulding in particular rests in particular on the highly precise production of complex part geometries, wherein the versatility of operation of the injection moulding process covers the requirements for an inexpensive and economical production of plastic parts in an optimal manner.

At the same time, there is an ever-increasing demand for plastic parts in a unit number of one and small batch sizes such as e.g. prototypes with the requirement of provision in a very short period as well as properties that are similar to those of injection moulded parts. For the production of such parts there are production processes that are widely known by the term prototyping. The production of such parts, in most cases, is based on generation of the geometry from 3D data. These geometries are produced in a wide variety of forms by appropriate means such as melting powder layers by the application of heat, e.g. using lasers, additive systems such as compression processes in a different connecting form of the powder parts or also in the so-called melt extrusion process.

A device, wherein a plasticising unit known in injection moulding technology is coupled to a pressurisable material storage device for the liquid phase of a material, is known from DE 10 2009 030 099 B4 that forms the basis of the preamble of claim 1. To generate an object on an object support in a construction area, this material is discharged in the form of drops through an outlet, wherein because of the adhesion forces of the material a high pressure in the range of up to 200 MPa and generally also high melting temperatures must be applied. In this case the drops should have a size of 0.01 to 1 $mm^3$. The opening time of the pulsable closure element at the outlet of the discharge unit should preferably lie in the range of few milliseconds and the diameter of the outlet should lie in the range of few tenths of a millimetre. For this purpose, a flexure hinge respectively solid body joint is proposed there, which is operated by means of an actuator in the form of a piezoelectric element. It is already proposed there in paragraph [0031] and [0032] to configure the actuator as a force sensing element to measure and readjust the initial stressing of the flexure hinge at the operating point. However, a separate sensor system is provided for this. The aim is to influence the form of the material to be discharged in a specific and deliberate manner such as the drop form, for example. The structure of the device forming the basis for that device is known from EP 1 886 793 A1.

With that arrangement a viscous fluid under pressure can be discharged in very small droplets through a nozzle, wherein the nozzle diameter can be about 0.1 mm and the working temperatures of the fluid can reach up to 450° C. Since a dynamic seal of structural parts sliding on one another is difficult to control in these working conditions, the flexure hinge that uses the elastic material properties for opening and closure the nozzle was employed there. The discharge of drops to construct the three-dimensional object occurs at a very high frequency of about 1 to 5 kHz. Therefore, the entire discharge unit must have a relatively high inherent rigidity. On the other hand, the desired amplitude and force of the actuator in the form of a piezoelectric element are technically not freely adjustable and also determine the costs of these components. Typically, such an element can generate forces of about 100 N and strokes of about 0.1 mm. To enable the closure element in the form of the flexure hinge to be operated and at the same time withstand the high fluid pressure of up to 200 MPa, a micromechanical adjustment to the desired operating point of the discharge unit is as necessary as a determination of the respective production-related properties of the components used such as e.g. the elasticity constant of the flexure hinge and the maximum elastic working range thereof.

This is all the more necessary when the objective is to obtain a good surface of the object to be produced, since then the drop size usually lies in the range of 0.001 $mm^3$. To construct objects in the $cm^3$ range, strokes of $10^6$ and more for each object are then quickly necessary. With such a number of alternating loads it is necessary to operate the closure element in a restricted elastic range in order to obtain an acceptable service life.

The stroke of the actuator amounts to about 0.03 to 0.05 mm under the existing installation conditions. Thus, the adjustment path is smaller than the sum of all the faults arising as a result of production tolerances or different thermal expansion of the individual structural parts, the micro-deformation at the nozzle needle and nozzle etc. However, the application force must always be kept constant during the course of the discharge process, so that no unwanted discharge of material occurs and the drop size can be kept constant. A very sensitive equilibrium of forces is present because of the high pressure in the material. If the application force deviates downwards, a continuous thread discharge results instead of droplets. When the application force is too high, the nozzle can no longer be opened.

BRIEF SUMMARY

The invention provides a method, with which a closure element on such a device can be operated reliably.

According to the method, an adjusting element and a control for its operation are developed, in which working from the current operating conditions a mapping is complied, within which the device is to be operated more effectively. For this, the application force of the actuator is determined, deviations are recognised and independently corrected. The basic principle is the determination of a mapping for an elastic deformation of the closure element by means of the actuator operated by an adjusting element, wherein the closure element is then operated within this mapping by adjusting an elastic working range of the closure element by means of the adjusting element.

Starting from a mechanical release point, which is defined by the actuator, which is preferably configured as a piezoelectric element, just touching the closure element, the elastic properties of the closure element are preferably determined firstly without pressure at the operating temperature in cooperation with the actuator. A mapping under operating pressure and at operating temperature is then worked out, so that an operating state in the elastic range can be reliably assured in accordance with the defined individual arrangement of the components of the device. As a result of this, a matching of the operating point occurs with consideration of the properties of the individual components of each discharge unit inline by means of a prestressing device preferably driven by means of a servomotor and measurement of the prestressing force by means of the actuator.

If a piezoelectric element is used as actuator in this case, this can be switched over between active operation and measurement, so that a simple and reliable determination and control results. The zero point is firstly measured and adjusted at operating temperature without mass pressure. Starting from this, the elastic deformability of the closure element is measured at operating temperature. The measurement and adjustment of the prestressing force necessary for sealing starting from the adjusted release point at operating temperature under pressure occur along with this. Under these conditions the maximum elastic deformability under operating temperature and pressure is determined to thus obtain the shortest possible paths at the boundary between the open and closed closure element. The control unit then controls the operation of the adjusting element of the actuator in the range of the permitted operating data for a continuous operation of the discharge unit that is as far as possible wear-free, wherein there is no departure from the measured elastic operating mapping. This operating mapping is preferably re-measured cyclically in order to examine whether the discharge unit and in particular the flexure hinge used as closure element is still in order.

Further advantages are evident from the sub-claims and the following description of a preferred exemplary embodiment.

BRIEF DESCRIPTION OF THE FIGURES

The invention is explained in more detail below on the basis of an exemplary embodiment represented in the Figures.

DETAILED DESCRIPTION

Before the invention is described in detail it should be noted that it is not restricted to the respective structural parts of the device and the respective method steps, since these structural parts and methods can vary. The terms used here are merely intended to describe particular embodiments and are not used for restriction. Moreover, when the singular or indefinite article is used in the description or in the claims, this also relates to the plural of these elements unless the overall context clearly indicates something different.

Figure 1:
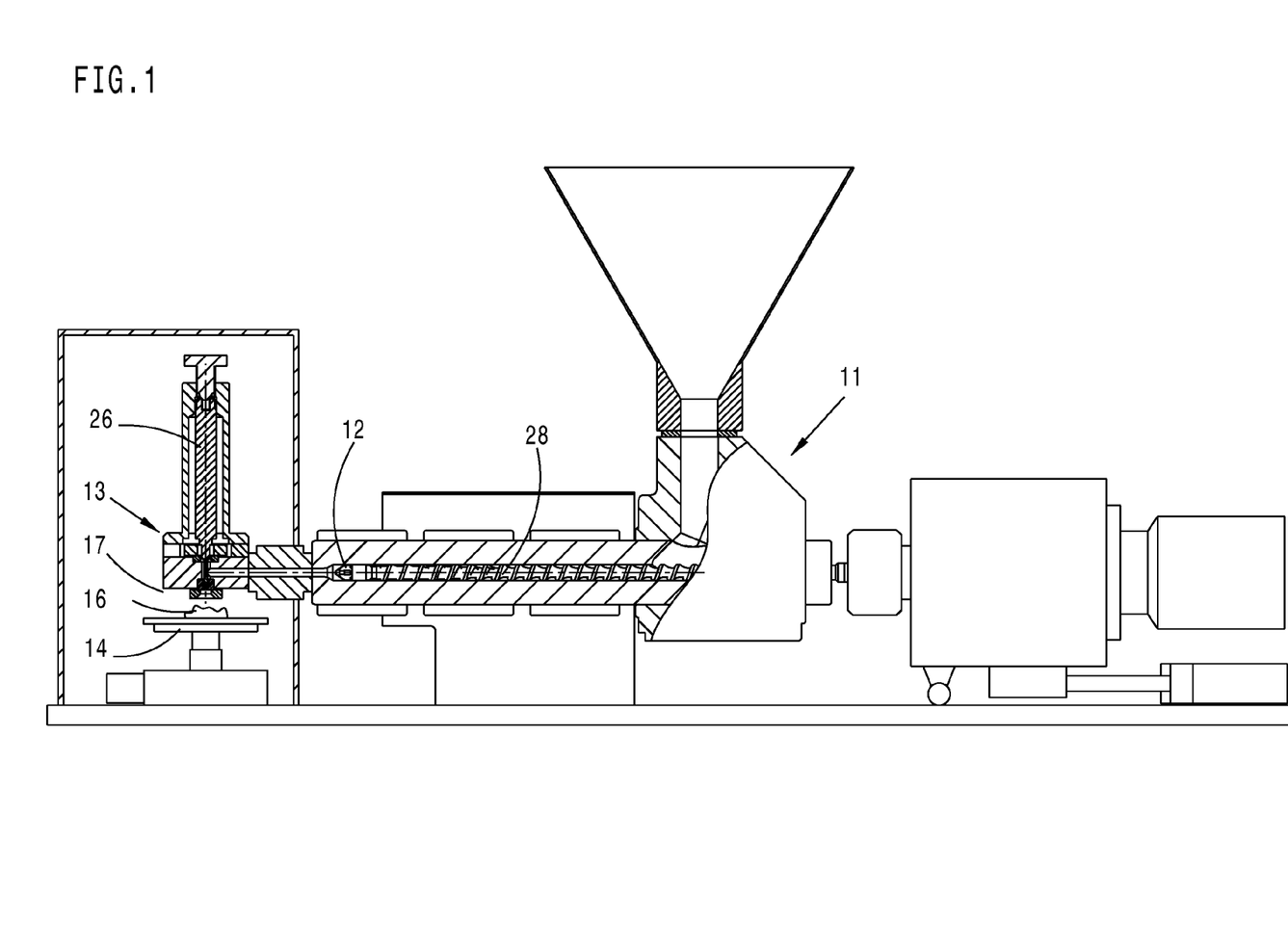
FIG. 1 is a side view in partial section of a device for producing a three-dimensional object.
Figure 2:
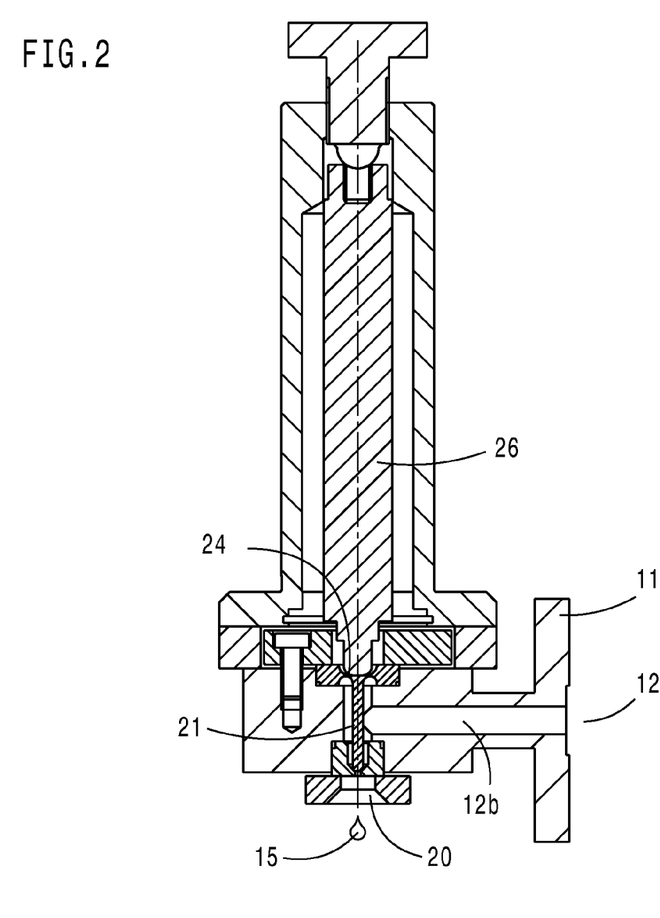
FIG. 2 shows an enlarged section from FIG. 1 in the region of the discharge unit.
Figure 3:
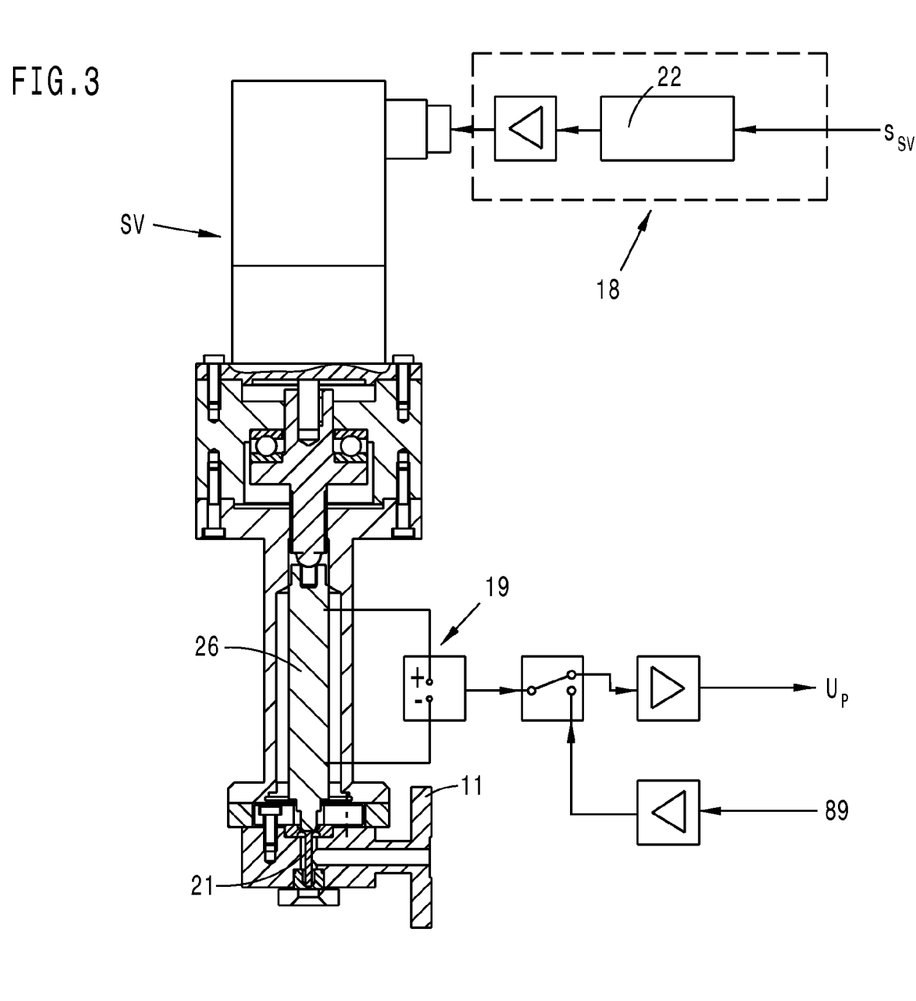
FIG. 3 shows the discharge unit according to FIG. 2 in association with the related control.

Before the method according to the invention is discussed in detail the device shown in FIGS. 1 to 3 will firstly be explained herewith. FIGS. 1 to 3 show the device for producing a three-dimensional object 16 from solidifiable material, which is either present in the starting state in a fluid phase or can be liquefied. The material is discharged sequentially in the form of drops 15, which are preferably discontinuous drops. The discharge occurs from the discharge unit 13 until the object 16 results layer by layer on an object support 14 in the construction area 17. The solidifiable material is a plasticised material such as silicone, for example, or a plasticisable material such as plastic or also materials in powder form, wherein fundamentally what matters is that the solidifiable material is present either in the starting state in a fluid phase or can be liquefied. The material can also be a material that is reversibly meltable under heat application and is therefore recyclable. Any other desired materials can be used and above all can be discharged through the at least one discharge unit. It is advantageous here that materials that are usual in injection moulding technology can be used, since the material, which will be discussed below, is processed in a plasticising unit that is known per se and is known from injection moulding technology. Expensive special materials are not necessary.

The solidifiable material has a so-called laminar source flow in the fluid phase. The accumulation of the molten material on the wall, inter alia, goes into the source flow. This becomes most clear when considering the insights from injection moulding technology. When mould filling a simple rectangular channel the molten material is injected via a so-called sprue point and from this point begins to spread in a circular shape with closed flow fronts until it fills the complete width of the cavity. Some time later the region between the inlet and the flow front can then be considered as practically formed. A particular flow situation, the "source flow", prevails at the flow front itself, since the flow lines in this region look like a source if observed in relation to a coordinate system moved therewith. The melt flows between two rapidly hardened substance layers lying close to the cavity surface, wherein said melt advances in the centre of the cavity towards the flow front at higher speeds. Shortly before the melt reaches the flow front, its speed component decreases in flow direction, it flows at an angle to the wall until it abuts the wall.

On the one hand, the laminar source flow is of advantage for the generation of drops 15 'aligned' to the construction area 17 because of its laminar configuration, while on the other hand, above all in the case of the formation of small drops, precisely here there are also the problems that render a transfer with devices and materials known from injection moulding technology difficult. As a result of the wall adhesion, the substances can only be formed with difficulty into drops with the desired small volumes, preferably in the range of smaller than to equal to 1 $mm^3$ and desired flight speed, while a correspondingly high viscosity of the material is important precisely for the formation of a suitable drop shape of a discontinuous drop.

This also distinguishes the used materials from the previously known waxes. Because of their viscosity waxes can be output in the normal thermoprinting or inkjet process, i.e. by pure kinematic pressureless acceleration without pressure difference of the melted drop. The materials used here already differ therefrom in that their coefficient of viscosity is higher by one to several powers of ten. Thus, the dynamic coefficient of viscosity of the solidifiable material lies between 100 and 10000 [Pa s], wherein the solidifiable material is preferably a plastic or a resin usual in injection moulding technology. This renders processing from a pressurisable material storage device necessary, since pressures of more than 10 to 100 MPa (100 to 1000 bar) are certainly necessary, in particular when small discharge openings are used to obtain small drop volumes.

The desired volume of the drop 15 preferably lies in the range of 0.01 to 0.5 mm$^3$ in particular, preferably in the range of 0.05 to 0.3 mm$^3$ and particularly preferred in the region of about 0.1 mm$^3$. The diameter of the outlet 20 in particular is less than or equal to 1 mm, preferably about 0.1 mm. At an absolutely usual injection speed of 100 [cm$^3$/s], which transports the substance through a so-called point sprue with a diameter of 0.1 [mm], a value of 10 000 [m/s] results with a volume flow through area. This leads to a laminar source flow with flow speeds of up to 10 000 m/s for the fluid phase.

With its discharge unit 13 the device has the task of discharging highly viscous fluid materials such as melted plastics in extremely small quantities down to few micrograms from a material storage device 12, which is under high pressure and possibly at high temperature. The extremely small quantities/drops 15 of material are output in discrete individual portions, wherein their size can be influenced by the device. The discharged portions have such a high kinetic energy that they can overcome the adhesion forces and lift from the device and as drops 15 construct the object 16 on the object support 14 in the construction area 17.

Since these materials are liquid, but highly viscous with high adhesion force and low weight, the kinetic energy is transferred by means of a pressure difference between the material storage device 12 and the flight space for the drops 15 formed in the construction area 17. The portioning is achieved by means of a pulsed orifice, which is provided with a nozzle needle 21 as a closure element. As a result of the required dimensions of the portions and also the viscosity properties, pressures in the range of 100 MPa (1000 bar) and more, closure orifices smaller than 0.1 mm and, moreover, closure times of less than 0.001 s are usually necessary. Since the materials are mostly plastics, temperatures of up to 450° C. prevail in the material storage device.

Under these conditions the device is configured as a dosing unit with the fewest possible seals/contacts to the outside world. According to FIG. 2, for this the closure element 24 is configured as an elastically deformable flexure hinge respectively solid body joint, as is known from DE 10 2009 030 099 B4. A nozzle needle 21 is used in association with the flexure hinge as closure element 24. An actuator 26 acts preferably directly on the nozzle needle 21 or the flexure hinge on the rear side. The solidifiable material is converted into the fluid phase by means of a processing unit 11 and from there passes into at least one material storage device 12 and to the at least one discharge unit 13. From there the material is discharged through an outlet 20 provided with a pulsable closure element 24 in the direction of the construction area 17. In order to generate the pressure necessary for the drop-wise discharge, a pressure generating unit is provided that is formed by a plasticising unit known from injection moulding technology. The pressure generating unit is then the feed screw 28 shown in FIG. 1, for example, or a similar feeding means 28.

The nozzle needle 21 is attached directly to the resilient closure element 24, which closes off the material storage device 12 for the fluid phase of the material to the outside towards the actuator 26. Therefore, except for the filling opening of the material storage device 12 and the closure element, no further seals are necessary. Because of the restoring forces of the flexure hinge used in the exemplary embodiment a one-sided operation of the closure element for the nozzle needle 21 by means of the actuator 26 is sufficient.

The actuator 26 is preferably configured as a piezoelectric element and can be adjusted in initial stressing. By means of a sensor system 19, the signals of which adapt the position of the actuator 26 to the operating conditions in the material storage device and thus re-adjust the operating point, the outlet can be actuated so that the high pressures and also high temperature expansions can be compensated. According to FIG. 3, for example, the forces in the actuator 26 are detected and are re-adjusted to desired force values by means of the control 18 and the controller 22. In the configuration as piezoelectric element above all the actuator 26 can also be readily used as force sensing element in order to measure the initial stressing of the closure element 24 at the operating point and to re-adjust this by means of an adjusting element SV, preferably a servo adjusting element.

In principle operation and actuation of the actuator 26 are also possible with an additionally installed static strain gauge sensor, which must, however, be compensated in temperature. This can possibly occur once with the actuator 26 inline at operating temperature with determination of temperature characteristics for the installed strain gauge. With such a device a method for producing a three-dimensional object 16 can be operated as follows, for which reference is made to the flow charts of FIGS. 4 to 6.

In principle, the pulsable closure element 24 is operated by means of the actuator 26, wherein the initial stressing of the closure element 24 at the operating point can be measured by means of the actuator 26 and the initial stressing can be re-adjusted by means of the adjusting element SV. In other words, the actuator can switch back and forth between the active operation and the measurement process. By the measurement operation a mapping 89 for the elastic deformation of the closure element 24 is determined by means of the actuator 26 operated by the adjusting element SV. Following the determination of the mapping the closure element 24 is operated by means of the adjusting element SV within the mapping 89 in the case of an elastic deformation in an elastic working range, which assures as long a service life as possible for the closure element.

For this, a release point is determined in a first step 71. The release point is understood to mean the point, at which the actuator 26 just abuts against the closure element 24. This release point is firstly determined without pressure and at ambient temperature. The discharge unit 13 is then heated to operating temperature $T_0$ in step 72. At this operating temperature, but still without pressure, the release point is once again measured and adjusted by means of the actuator 26. Starting from the thus determined release point at operating temperature—still without pressure—the elastic deformability of the closure element 24 is now determined. The determination can occur according to Hooke's law by the spring constant being observed, i.e. as soon as the spring constant of the closure element 24 is dependent on path s of the adjusting element, there is no further purely elastic deformation present. Pressure is now applied to the fluid phase in the next step. Under these conditions the prestressing force necessary for sealing is now measured under pressure and with consideration of the previously determined deformability of the closure element 24 working from the release point at operating temperature $T_0$. A maximum elastic deformability is thus determined by means of an actuator at operating temperature $T_0$ and under pressure. This leads to the determination of a mapping, in particular when this process is determined at different operating temperatures in the usual operating temperature range of the discharge unit 13, so that a range in which there is no departure from the measured elastic operating mapping can be adhered to. This operating mapping is preferably also re-measured cyclically in order to examine whether the entire discharge unit 13, especially the flexure hinge—that could also be called a solid body joint—used as closure element 24, is still in order.

Figure 4:
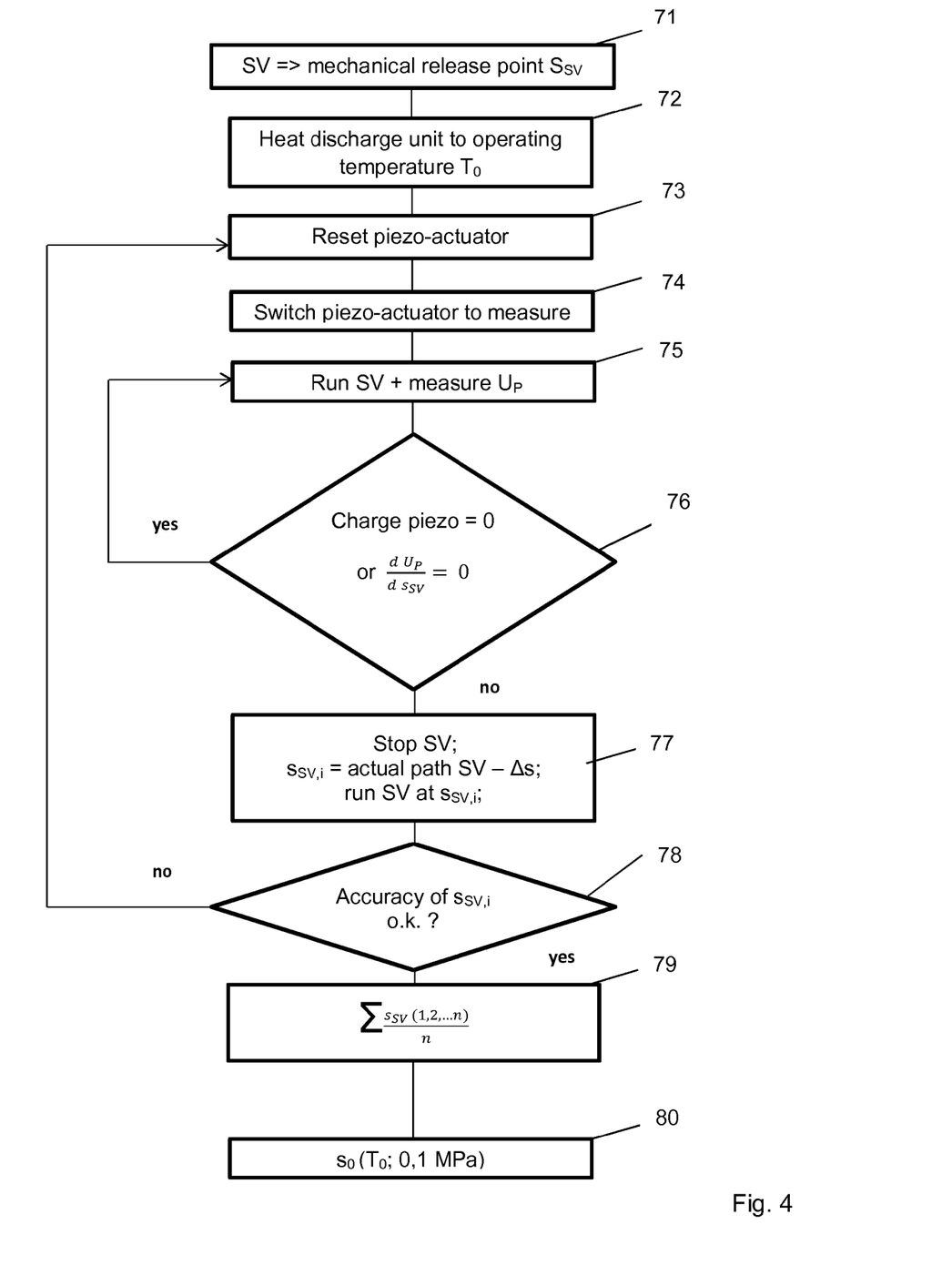
FIGS. 4 to 6 are flow charts of the procedure relating to the method.

According to FIG. 4 the temperature zero point is firstly determined in detail at operating temperature $T_0$. For this, in step 71 the adjusting element SV of the actuator 26 is returned to the mechanical release point, i.e. to the point at which the actuator 26 just abuts against the closure element 24. In step 72 the discharge unit 13 is heated to operating temperature $T_0$. The actuator 26 is now reset in accordance with step 73 and in accordance with step 74 switched over to measurement.

Next the adjusting element SV of the actuator 26 is operated and in this case the voltage Up of the actuator 26 is measured in accordance with step 75. In step 76 it is examined whether the charge at the piezoelectric element is equal to zero and/or the ratio of voltage to displacement path of the adjusting element is equal to zero (i.e. $d U_p/d s_{SV}=0$). As soon as this is the case, the adjusting element SV is stopped and this value, i.e. the path $s_{SV}$ of the adjusting element SV of the actuator 26 is stored in step 77. Then in step 77 the value is reduced by a small amount Δs to ensure that the voltage is again safely zero, the piezoelectric element is reset and the process repeated. This occurs until in step 78 a sufficient accuracy is established for the path $s_{SV}$. There thus result different values of $s_{SV}$ that are computationally averaged in step 79. The averaged value is stored as release point of the discharge unit 13 at operating temperature $T_0$ as $s_0(t; 0.1$ MPa).

Figure 5:
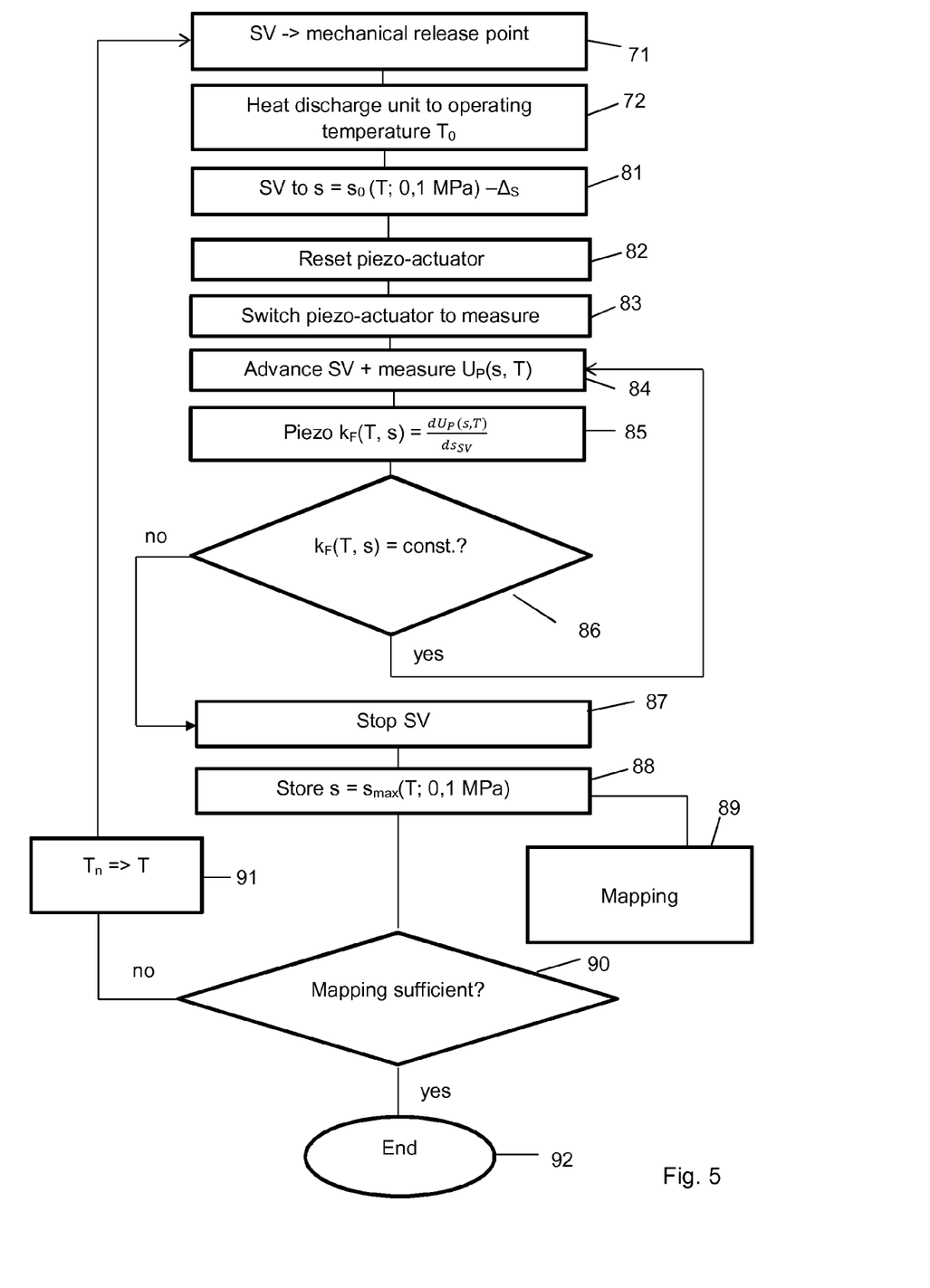

Next according to FIG. 5 the elastic expansion constant is determined at operating temperature $T_0$. For this, the adjusting element SV of the actuator 26 is firstly returned to the mechanical release point in step 71, as was already determined in step 71 in FIG. 4. The discharge unit 13 is then heated to operating temperature $T_0$. In step 81 the determined value $s_0(t; 0.1$ MPa) is now taken into account. Namely, the adjusting element is now adjusted to an adjustment path, which corresponds to this determined path minus a small amount Δs of 0.001 mm, for example. In step 82 the actuator 26 is reset and in step 83 switched over to measurement. The adjusting element of the actuator is now operated again and in this case the voltage $U_p(s, T)$ of the actuator 26 is measured with temperature in step 84. In this measurement in accordance with step 85 a real time evaluation of the spring constant $k_F$ of the flexure hinge occurs, i.e. it is measured whether the voltage $U_p$ of the actuator 26 changes in dependence on the path s over the movement path of the adjusting element (step 86). Namely, so long as the expansion constant $k_F$ (T, s)=$d U_p(s, T)/d s_{SV}$ is constant, i.e. is constant over the path $s_{SV}$ of the adjusting element SV, the closure element 24 is located in the elastic range. If this is no longer the case, the closure element lies in the non-elastic range, i.e. it is deformed. Therefore, the adjusting element SV is stopped in step 87, since the maximum elastic working deviation of the flexure hinge is then reached, i.e. the maximum elastic value of the closure element 24 as $s_{max}(T, 01$ MPa). This value is stored in the mapping 89, but at the same time it is also examined whether a repetition of the steps required for the determination of $s_{max}$ is necessary for other temperatures. If this is the case after step 90, i.e. the mapping is not yet sufficient, the temperature is changed accordingly in step 91 and the steps are repeated once again. For this, the sequences according to FIGS. 4 and 5 are determined once again for the changed temperature.

Figure 6:
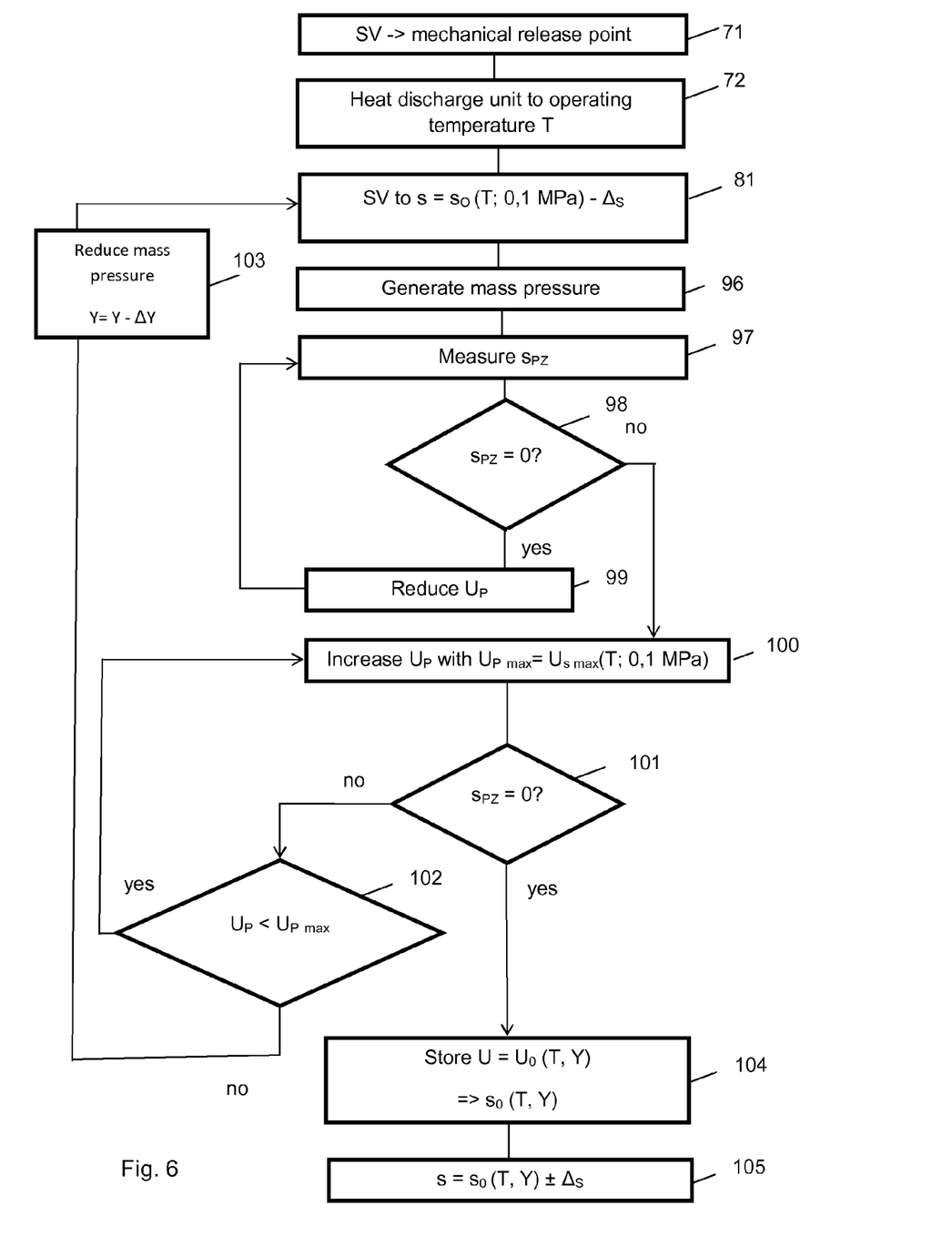

According to FIG. 6 the prestressing force necessary for sealing is determined under operating pressure. In accordance with steps 71 and 72 in this case the adjusting element SV is firstly adjusted to the mechanical release point once again and the discharge unit 13 is heated to operating temperature. As in step 81, in FIG. 6 the adjusting element is now adjusted to the adjustment path of $s_0(T; 0.1$ MPa) minus a small amount Δs. Pressure is then generated and according to FIG. 6 it is measured whether the feeding means 28 is still travelling a path $s_{PZ}$ in the plasticising cylinder, i.e. whether material is still being transported. This concerns the measurement of the advancing speed of the feeding means 28. Alternatively, it could also be measured whether material is still discharging at the outlet 20 of the discharge unit 13, which can be monitored by means of a camera, for example.

Therefore, if an advancing speed of the feed screw is still present or material is still discharging, the voltage $U_P$ at the actuator 26 is increased in step 99 until the advancing speed of the feeding means 28 becomes zero or alternatively the optical monitoring does not detect any material discharging from the outlet 20. In this case, the upper limit is the voltage $U_{P\,max}$ at a maximum value of $s_{max}(T; 0.1$ MPa) in accordance with step 100. Thus, if a transport speed of zero is reached, after the interrogation 101 in step 104 the thus determined voltage is stored as minimum operating voltage of the actuator $U_0(T_0, Y)$ at operating temperature $T_0$ and pressure Y for the condition of closed closure element 24 at the discharge unit 13. The operation of the device is then started from the thus determined adjustment path $s_0(T,Y)$ of the adjusting element plus/minus a small amount Δs.

If in step 98 no advancing speed of the feed screw 28 or no further discharging material is already discernible, then the voltage $U_P$ is reduced until such a discharge can be established in step 98. However, if it is not possible with this procedure to either achieve the discharge of material by reducing the voltage $U_P$ or prevent the discharge of material by increasing the voltage, which is interrogated under consideration of the maximum voltage $U_{P\,max}$ with a known spring constant in step 102, the mass pressure is dropped in step 103 and the method started once again. In this case, the actuator 26 is run in plus or minus direction to the maximum path for the elastic adjustments of $s_{max}(T; 0.1$ MPa), i.e. until either the advancing speed of the feeding means 28 becomes zero or no more material discharges. When the device is ready for operation, the corresponding optimum operating point can be determined in this way.

The invention claimed is:

1. Method for producing a three-dimensional object from solidifiable material, which is either present in the starting state in a fluid phase, by the sequential discharge of drops from at least one pressurizable material storage device for the fluid phase by means of at least one discharge unit through an outlet provided with a pulsable closure element, the method comprising:
   actuating the timed closure element by means of an actuator,
   measuring an initial stressing of the closure element at the operating point by means of the actuator,
   controlling the initial stressing of the closure element by means of an adjusting element,
   determining a mapping for the elastic deformation of the closure element by means of the actuator actuated by the adjusting element, and
   adjusting an elastic working range of the closure element by means of the adjusting element within the mapping.

2. Method according to claim 1, wherein the following steps are performed to determine the mapping:
   a) determining the release point defined by the disposition of the actuator on the closure element without pressure and at ambient temperature,
   b) heating the discharge unit to operating temperature,
   c) determining the release point at operating temperature without pressure, d) measuring the elastic deformability of the closure element by means of the actuator working from the release point at operating temperature without pressure in accordance with step c) by operating the adjusting element, e) applying the pressure to the fluid phase in the material storage device, f) measuring the prestressing force required for sealing by means of the actuator working from the release point at operating temperature under pressure in accordance with step e) taking into consideration the deformability in accordance with step d) and adjusting the prestressing force by means of the adjusting element, g) measuring the maximum elastic deformability by means of the actuator at operating temperature and under pressure, h) operating the production process by means of the actuator within the mapping determined in steps f) and g).

3. Method according to claim 1, wherein a piezoelectric element operated on one side is used as actuator.

4. Method according to claim 1, wherein a flexure hinge is used as closure element.

5. Method according to claim 1, wherein in an operating state, the mapping determined in claim 1 is measured cyclically.

6. Method according to claim 2, wherein the following steps are performed to determine the release point at operating temperature in steps b) to c):

returning the adjusting element of the actuator to the release point defined in step (a), heating the discharge unit to operating temperature, resetting the actuator, switching the actuator over to measurement, operating the adjusting element of the actuator with measurement of the voltage of the actuator until a charge of a piezoelectric element is greater than zero and/or until the increase of the voltage over the adjustment path ($s_{sv}$) of the adjusting element is other than zero (d $U_p$/d $s_{sv} \neq 0$), reducing the adjustment path ($s_{sv}$) to a point that is smaller than the point at which the charge of the piezoelectric element is greater than zero and/or the increase of the voltage over the adjustment path ($s_{sv}$) of the adjusting element is other than zero, and storing the adjustment path thus determined, storing the determined release point ($s_0(T_0; 0.1$ MPa$)$) of the adjusting element of the actuator of the discharge unit at operating temperature.

7. Method according to claim 6, wherein the following steps are performed to determine an elastic expansion constant of the closure element at operating temperature:

returning the adjusting element of the actuator to the release point determined in step a), heating the discharge unit to operating temperature, operating the adjusting element of the actuator to a point that is smaller than the release point ($s_0(T_0; 0.1$ MPa$)$) determined in claim 6, resetting the actuator, switching the actuator over to measurement, operating the adjusting element of the actuator with measurement of the voltage ($U_p(s, T)$) of the actuator, evaluating in real time the expansion constant ($k_F(T, s)$) as the differential of the voltage of the actuator over the path (s) of the adjusting element (d $U_p(s, T)$ /ds), stopping the adjusting element of the actuator if $k_F(T, s)$ is not constant and becomes dependent on the path ($s_{sv}$) of the adjusting element, storing the maximum elastic deflection ($s_{max}(T; 0.1$ MPa$)$) of the closure element, returning the adjusting element to the release point ($s_0(T; 0.1$ MPa$)$) determined in claim 6 and switching the actuator over to actuation.

8. Method according to claim 6, wherein the method is repeated for different operating temperatures of the closure element and a mapping for the existing arrangement comprising adjusting element, closure element and actuator is stored, which is used in the method for producing the object.

9. Method according to claim 6, wherein the following steps are performed for adjusting the prestressing force required for sealing:

1. returning the adjusting element SV of the actuator to a point that is smaller than the release point ($s_0(T; 0.1$ MPa$)$) determined in claim 6,
2. heating the discharge unit to operating temperature,
3. operating the adjusting element of the actuator to the release point ($s_0(T; 0.1$ MPa$)$) determined in claim 6,
4. applying the desired pressure to the material storage device,
5. measuring the advancing speed of a feeding means of the processing unit and/or detecting the material discharging from the outlet,
6. operating the adjusting element of the actuator until the advancing speed of the feeding means of the processing unit is equal to zero or until no further material discharges at the discharge unit,
7. detecting and storing the operating voltage ($U_0(T, Y)$ of the actuator corresponding to this state at operating temperature and pressure (Y) in the material storage device for a closed outlet.

10. Method according to claim 9, wherein for the case that already during the first measurement of the advancing speed of the feeding means of the processing unit the advancing speed is already zero or during measurement of the material discharging at the discharge unit no further material is discharging, the voltage of the adjusting element of the actuator is reduced until an advancing speed of the feeding means is present or until material discharges.

11. Method according to claim 9, wherein if the point for the currently still closed outlet cannot be determined, the pressure is reduced in the material storage device and steps 3 to 5 are repeated, wherein the actuator is then operated in both directions at maximum up to maximum elastic deflection ($+/-s_{max}(T; 0.1$ MPa$)$) of the closure element until the advancing speed of the feeding means of the processing unit becomes zero or no discharging material at the outlet is currently detected.

* * * * *